United States Patent Office 3,175,896
Patented Mar. 30, 1965

3,175,896
HERBICIDAL NEMATOCIDAL AND FUNGICIDAL METHOD
Friedrich Arndt, Berlin-Frohnau, Alfred Czyzewski, Berlin-Tempelhof, Eugen Griebsch, Berlin-Britz, and Gerhard Liedtke, Berlin-Reinickendorf, Germany, assignors to Schering, A.G., Berlin, Germany
No Drawing. Filed Nov. 7, 1961, Ser. No. 150,634
Claims priority, application Germany, Nov. 15, 1960, Sch 28,776
7 Claims. (Cl. 71—2.3)

This invention relates to chemical pest control agents, and more particularly to chemical agents which have selective biocidal effects on certain weeds, on fungi, and on nematodes, and to methods of protecting vegetal crops by the use of such agents.

The pest control agents of the invention are carbodiimide compounds of the formula $$R_1—N=C=N—R_2 \qquad (1)$$

wherein $R_1$ and $R_2$ represent organic radicals of the group consisting of lower alkyl; cycloalkyl having a saturated carbon ring of 5 to 8 members, one of the members being directly connected to one of the nitrogen atoms of the formula; lower alkenyl; radicals of the formula —Alk—X wherein Alk is lower alkylene and X is lower alkoxy, phenyl, lauroxy, or morpholyl; radicals of the formula

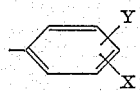

wherein Y and Z are hydrogen, lower alkyl, halogen, $NO_2$, lower alkoxy, or a $—(CH)_4=$chain jointly constituted by Y and Z and attached to adjacent carbon atoms of the benzene ring of the last-mentioned formula; alkenoyl having substantially 18 carbon atoms; and furfuryl.

The use of compounds of Formula 1 in a method of protecting a vegetal crop is novel, and the selective biocidal properties of such compounds are entirely unexpected and unpredictable.

Compounds of Formula 1 are readily prepared from the corresponding thiourea derivatives by the reaction $$R_1—NH—CS—NH—R_2+HgO=$$
$$R_1—N=C=N—R_2+HgS+H_2O \qquad (2)$$

Lead oxide may be substituted for mercury oxide in the reaction of Formula 2. The thiourea derivatives are also converted to the corresponding carbodiimide derivatives by oxidation with alkaline hypochlorite solutions.

Most of the compounds of Formula 1 are capable of being distilled at reduced temperature, and Table I lists boiling points of representative examples of carbodiimides suitable for the plant protection method of the invention together with the pressure at which the boiling point is measured. The radicals $R_1$ and $R_2$ are listed, and will be understood to be linked by the group —N=C=N—.

Table I

| $R_1$ | $R_2$ | Boiling Point | |
|---|---|---|---|
| | | mm. Hg | °C. |
| Cyclopentyl | Cyclopentyl | 13 | 126–130 |
| Cyclohexyl | Cyclohexyl | 15 | 158–161 |
| Cycloheptyl | Cycloheptyl | 0.8 | 140–144 |
| Cyclooctyl | Cyclooctyl | 0.3 | 151–154 |
| Methyl | Cyclohexyl | 0.5 | 39 |
| Isopropyl | do | 0.6 | 61 |
| tert.-Butyl | do | 10 | 101–102 |
| Isopropyl | Cyclooctyl | 1.5 | 97–101 |
| Methyl | Camphyl | 0.8 | 75–85 |
| Isopropyl | do | 12 | 137–139 |

Table I—Continued

| $R_1$ | $R_2$ | Boiling Point | |
|---|---|---|---|
| | | mm. Hg | °C. |
| Propyl | Phenyl | 0.9 | 81–82 |
| Isopropyl | do | 0.2 | 60–61 |
| Sec.-Butyl | do | 0.5 | 78–80 |
| Hexyl | do | 13 | 160–163 |
| Isopropyl | 4-fluorophenyl | 0.2 | 71 |
| Allyl | do | 1.5 | 92–97 |
| Isopropyl | -3-chlorophenyl | 0.5 | 85–87 |
| Do | 4-bromophenyl | 1.0 | 109–113 |
| Do | 3-nitrophenyl | 0.5 | 123–125 |
| Do | -2-methylphenyl | 2 | 85–86.5 |
| Do | 2-ethoxyphenyl | 0.8 | 115–118 |
| Do | 3-chloro-4-methylphenyl | 1.5 | 119–121 |
| Do | α-Naphthyl | 0.7 | 135–137 |
| Hexyl | Isopropyl | 2 | 71 |
| Isopropyl | do | 13 | 40–43 |
| Do | Isobutyl | 15 | 56–61 |
| o-Tolyl | o-Tolyl | 0.6 | 144–145 |
| tert.-Butyl | Furfuryl | 1 | 68–70 |
| Phenyl | do | 0.6 | 118–120 |
| Isopropyl | 3-methoxypropyl | 1 | 49–57 |
| Do | Benzyl | 0.4 | 75–77 |
| Do | β-Phenylethyl | 0.6 | 94–97 |
| Phenyl | Benzyl | 0.5 | 132–134 |
| tert.-Butyl | β-Morpholinoethyl | 1.6 | 111–114 |
| Isopropyl | 5,6,7,8-tetrahydronaphthyl-1. | 0.8 | 135–139 |

The compounds defined herein can be incorporated with various materials to prepare the new compositions of the invention either in liquid or solid form.

For example, solutions of the compounds in organic solvents such as aromatic and aliphatic hydrocarbons, for instance benzene, xylene, cyclohexanol, ethylene chloride, methylene chloride, can be applied directly as pesticides.

This method of application, however, is less favourable.

Suitable compositions are prepared by mixing the compounds with an inert solid carrier including magnesium and calcium carbonate, calcium sulphate, calcium phosphate, bentonite, kieselguhr, bleaching earth, and the like.

The percentage by weight of the essential active ingredient in these dust compositions will vary, but in general will be 0.5 to 95% by weight of the pesticidal composition.

Liquid pesticidal compositions consist for example of the compounds dissolved in an organic solvent or mixed with a solid carrier and homogeneously dispersed in water. To secure such homogeneous dispersion a surface-active agent may be used. These agents, especially of the anionic and nonionic type, cause the composition to be easily dispersed in water to give aqueous sprays which constitute a most desirable form of application.

Generally the surface-active agent will not comprise more than 30% by weight of the composition. Usually the minimum will be 0.1%.

The solvents used include benzene, xylene, kerosene, methylenechloride, chloroform, and the like. In the same way the compounds also may be incorporated in oils, such as paraffin oil; and the like.

The inert solid carriers include those mentioned above.

In another method for application especially for weed control the compounds may be combined with other herbicides such as isopropyl-N-phenyl-carbamate, isopropyl-N-(3-chlorophenyl)-carbamate, 2-chloro - 4 - isopropylamino-6-ethylamino-1,3,5-triazin, the alkali salts of 4-chloro-2-methyl-phenoxyacetic acid or other known herbicides.

They also may be mixed with solid fertilizers to form either powdery or granular compositions that can be used in the cultivation of agricultural crops.

Typical examples of preparing the new compositions are as follows:

(1) 20 pts. of a carbodiimide are dissolved in
60 pts. of xylene and mixed with 20 pts. of a tributylphenol-polyglycol-ether (i.e. nonionic surface agent).

This composition is readily dispersible in water and provides an aqueous spray composition by mixing with 1000–10,000 pts. of water.

(2) 40 pts. of a carbodiimide are dissolved in
50 pts. of xylene and mixed with
10 pts. of a mixture of the calcium salt of dodecylbenzene sulfonic acid, fatty acids polyglycolester, and tributylphenol-polyglycol-ether (i.e. anionic and nonionic surface agents).

This composition is well dispersible in water and gives stable emulsions.

(3) 20 pts. of a carbodiimide of this invention are homogeneously mixed with
40 parts of calciumcarbonate and
40 parts of the calcium salt of lignin sulfonic acid in a micropulverizer mill until a suitable particle size is attained.

This product provides a homogeneous powder suitable for application after mixing with 1000–10,000 parts of water.

It is to be understood that this invention is not limited to these specific examples.

Several of the pest control agents of the invention may be employed jointly or simultaneously, and they may be combined with other pesticidal agents.

The agents also may contain additives such as binding agents, compressed gases, perfumes or stabilizers.

The pest control agents of the carbodiimide type have been found to be particularly useful for combatting weeds and other undesired vegetal growth. It is generally difficult to combat weeds in vegetal crops selectively, particularly when the crop plants and the weeds are closely related, or belong to the same family of plants as is often the case. Known herbicidal agents which are suitable for application to the parts of plants which are exposed above ground, particularly the leaves, are limited in their utility to only one type or a few species of vegetal crops.

We have now found that the N-substituted carbodiimide compounds are effective in combatting weeds in the post-emergence stage without affecting many crop plants. Classes of plants which are protected to advantage by these pest control agents include plants of the family of Umbelliferae and Ammiaceae such as carrots, parsley, and dill, but also mangels and sugar beets, corn and other cereal crops. It is particularly noteworthy that certain substituted carbodiimide compounds are selectively tolerated by beets which are notoriously sensitive to herbicides applied to their leaves.

The field of application of the pest control agents of the invention is thus very wide. The herbicidal effects are greatest on the juvenile stages of the weeds affected. Pesticidal compositions of the invention suitable for weed control in crops are preferably applied in amounts between 1 and 4 kilograms per hectare (kg./ha.) based on the active ingredient. Such amounts are sufficient for the destruction of such important and common weeds as chickweed, groundsel, shepherd's pouch, dead nettle, sow-thistle, stinging nettle, goosefoot, and the like.

Considering the fact that so many vegetal crops tolerate the carbodiimide compounds without suffering significant damage, the broad spectrum of weeds affected is surprising.

Where the susceptibility of crop plants need not to be taken into consideration, the amount of pest control agents of the invention applied per unit area may of course be increased beyond the preferred range indicated above. Larger amounts are indicated where weeds are to be destroyed on walkways and in paved areas.

Carbodiimide compounds which have been found to be particularly effective when employed in the pest control method of the invention include for instance:

N,N'-di-(cyclopentyl)-carbodiimide
N,N'-di-(cyclohexyl)-carbodiimide
N,N'-di-(cycloheptyl)-carbodiimide
N,N'-di-(cyclooctyl)-carbodiimide
N-allyl-N'-cyclooctyl-carbodiimide
N-isopropyl-N'-cyclooctyl-carbodiimide
N-methyl-N'-cyclooctyl-carbodiimide
N-isopropyl-N'-phenyl-carbodiimide
N-hexyl-N'-phenyl-carbodiimide
N-allyl-N'-oleyl-carbodiimide
N,N'-di(o-tolyl)-carbodiimide
N-phenyl-N'-(4-chloro-2-methyl-phenyl)-carbodiimide
N-phenyl-N'-benzyl-carbodiimide
N-tert.-butyl-N'-(3-lauryloxypropyl)-carbodiimide
N-phenyl-N'-furfuryl-carbodiimide
N-isopropyl-N'-α-naphthyl-carbodiimide The herbicidal effects and other specific advantageous fields of application of the pest control agents of the invention are illustrated by the following examples, but it will be understood that the invention is not limited to the specific embodiments chosen for the purpose of the disclosure.

EXAMPLE I

Aqueous emulsions of the carbodiimide compounds listed in Table II below and containing the active ingredient in a concentration of 0.5 percent are sprayed on young test plants having a height of 10 to 20 centimeters. The tests are performed in a greenhouse under controlled conditions of temperature and moisture.

The plants employed are tomatoes and dwarf-beans. The active ingredients of the emulsions are identified by the radicals $R_1$ and $R_2$ in Formula 1. The effect on the treated plants is indicated by one of four code numbers which have the following meaning:

0—Destroyed
1—Severly damaged
2—Damaged
4—Slightly damaged

Table II

| $R^1$ | $R^2$ | Effect on— Tomatoes | Effect on— Dwarf beans |
|---|---|---|---|
| Cyclopentyl | Cyclopentyl | 0 | 0 |
| Cyclohexyl | Cyclohexyl | 0 | 0 |
| Cycloheptyl | Cycloheptyl | 0 | 0 |
| Cyclooctyl | Cyclooctyl | 0 | 0 |
| Methyl | Cyclohexyl | 2 | 2 |
| Do | Cyclooctyl | 0 | 2 |
| Do | Camphyl | 0 | 2 |
| Isopropyl | Cyclohexyl | 2 | 2 |
| Tert.-butyl | do | 4 | 4 |
| Allyl | Cyclooctyl | 0 | 4 |
| Isopropyl | do | 0 | 0 |
| Propyl | Phenyl | 4 | 1 |
| Isopropyl | do | 2 | 0 |
| Sec.-butyl | do | 0 | 1-2 |
| Hexyl | do | 0 | 0 |
| Oleyl | do | 2 | 1 |
| Isopropyl | 4-fluorophenyl | 1-2 | 3-4 |
| Allyl | do | 1-2 | 3 |
| Isopropyl | 3-chlorophenyl | 2 | 4 |
| Do | 4-bromophenyl | 0-1 | 1-2 |
| Do | 3-nitrophenyl | 1-2 | 1-2 |
| Tert.-butyl | 4-chlorophenyl | 4 | 4 |
| Isopropyl | 2-methylphenyl | 4 | 2 |
| Do | 2-ethoxyphenyl | 0 | 0 |
| Do | 3-chloro-4-methylphenyl | 1-2 | 2 |
| Do | α-Naphthyl | 0 | 0 |
| Do | Isobutyl | 3-4 | 3 |
| Do | Hexyl | 0 | 0 |
| Allyl | Oleyl | 0 | 0 |
| Isopropyl | Isopropyl | 4 | 4 |
| o-Tolyl | o-Tolyl | 0 | 0 |
| 2,4-dimethylphenyl | 2,4-dimethylphenyl | 2 | 1 |
| Phenyl | 4-chloro-2-methylphenyl | 1 | 0 |
| Tert.-butyl | Furfuryl | 4 | 4 |
| Phenyl | do | 0 | 1 |
| Isopropyl | 3-methoxypropyl | 2-3 | 2-3 |
| Tert.-butyl | 3-lauryloxypropyl | 0 | 0 |
| Isopropyl | Benzyl | 0 | 1 |
| Do | β-Phenylethyl | 0 | 0 |
| Benzyl | Phenyl | 0 | 0 |
| Tert.-butyl | β-Morpholinoethyl | 3-4 | 4 |
| Isopropyl | 5,6,7,8-tetrahydronaphthyl-1 | 1 | 0-1 |

EXAMPLE 2

N,N' - di(cyclohexyl) - carbodiimide, N,N' - di(cyclooctyl)-carbodiimide, and N-tert.-butyl-N'-(3-lauryloxypropyl)-carbodiimide are emulsified in water to a concentration of 1 kg. per 1,000 liters. The emulsions are sprayed on respective carrot fields in such amounts as to deposit 2 kg./ha. of the two first-mentioned carbodiimide compounds and 1 kg./ha. of the last mentioned compound. The carrots are in the germination to two-leaf stage and show no adverse effects from the treatment. Accompanying weeds originating from contaminated carrot seeds are destroyed or severely damaged as seen from Table III in which the effects of the treatment are evaluated on an arbitrary scale ranging from 10 (no noticeable effect) to 0 (fully destroyed). The carbodiimide compounds are identified by the substituent radicals $R_1$ and $R_2$ in Formula 1.

*Table III*

| $R_1$ | $R_2$ | Active Agent | Carrots | Lamium amplexicaule | Senecio vulgaris |
|---|---|---|---|---|---|
| Cyclohexyl | Cyclohexyl | 2 | 10 | 1.8 | 0.3 |
| Cyclooctyl | Cyclooctyl | 2 | 10 | 1 | 1 |
| tert.-Butyl | 3-lauryloxypropyl | 1 | 10 | | 0 |

| $R_1$ | $R_2$ | Chenopodium album | Galinsoga parviflora | Capsella bursa pastoris |
|---|---|---|---|---|
| Cyclohexyl | Cyclohexyl | 0.3 | 0.5 | 0 |
| Cyclooctyl | Cyclooctyl | 0.3 | 0 | 0 |
| tert.-Butyl | 3-lauryloxypropyl | 0.5 | 1.5 | |

| $R_1$ | $R_2$ | Thlaspi arvense | Stellaria media | Urtica urens | Panicum setaria |
|---|---|---|---|---|---|
| Cyclohexyl | Cyclohexyl | 0 | 1 | | |
| Cyclooctyl | Cyclooctyl | 0 | 1 | | |
| tert.-Butyl | 3-lauryloxypropyl | | | 1 | 9 |

EXAMPLE 3

The same compounds are applied to parsley plots in an analogous manner. The weeds accompanying the parsley are in a somewhat more mature stage than those treated in Example 2. They react in a similar manner as in Example 2. The results achieved are tabulated on Table IV using the same scale of evaluation as in Table III.

*Table IV*

| $R_1$ | $R_2$ | Active Agent | Parsley | Galinsoga parviflora | Senecio vulgaris |
|---|---|---|---|---|---|
| Cyclohexyl | Cyclohexyl | 2 | 10 | 6 | 0 |
| Cyclooctyl | Cyclooctyl | 2 | 10 | 3.5 | 1 |
| tert.-Butyl | 3-lauryloxypropyl | 2 | 10 | 5 | 1 |

| $R_1$ | $R_2$ | Chenopodium album | Urtica urens | Panicum sanguinale |
|---|---|---|---|---|
| Cyclohexyl | Cyclohexyl | 1 | 0 | 1 |
| Cyclooctyl | Cyclooctyl | 0.5 | 0 | 10 |
| tert.-Butyl | 3-lauryloxypropyl | 0 | 0 | 10 |

EXAMPLE 4

Portions of a sugar beet field infested with weeds in a fairly uniform manner are respectively treated with aqueous emulsions of ten different carbodiimide compounds of the invention. Six of the ten compounds tested have no noticeable effect on the sugar beet leaves. The remaining four have only slight effects on the crop. Most of the accompanying weeds are destroyed or severely damaged by the pest control agents, but selective resistance to some of them by some weeds indicate the need for combined application of several carbodiimide compounds.

The results observed in the several sugar beet plots are tabulated in Table V in the same manner as in the preceding examples.

*Table V*

| $R_1$ | $R_2$ | Active Agent | Sugar Beets | Galinsoga parviflora | Senecio vulgaris | Sonchus oleraceus |
|---|---|---|---|---|---|---|
| Cyclohexyl | Cyclohexyl | 2 | 9 | 1 | 1 | 0 |
| tert.-Butyl | 3-lauryloxypropyl | 2 | 7 | 0 | 3 | 5 |
| Isopropyl | Phenyl | 4 | 7 | 0.5 | 1 | 0 |
| Allyl | Cyclooctyl | 4 | 10 | 0.5 | 1 | 0.5 |
| Phenyl | Furfuryl | 4 | 10 | 2 | 1 | |
| Cyclopentyl | Cyclopentyl | 1 | 10 | 0 | 1 | |
| Cycloheptyl | Cycloheptyl | 0.75 | 10 | 0.5 | 2 | |
| Cyclooctyl | Cyclooctyl | 0.5 | 10 | 1 | 2 | |
| Methyl | Cyclohexyl | 2 | 8 | 0 | 1 | |
| Isopropyl | Cyclooctyl | 2 | 10 | 0 | 1 | |

Table V—Continued

| R₁ | R₂ | Capsella bursa pastoris | Stellaria media | Lamium amplexicaule | Chenopodium album | Thlaspi arvense |
|---|---|---|---|---|---|---|
| Cyclohexyl | Cyclohexyl | 0 | 1 | 0 | | |
| tert.-Butyl | 3-lauryloxypropyl | 4 | 4 | 2 | | |
| Isopropyl | Phenyl | 0 | 6 | | | |
| Allyl | Cyclooctyl | 0.5 | 10 | 3 | 2.5 | 1 |
| Phenyl | Furfuryl | 2 | 9 | 3 | 3 | 4 |
| Cyclopentyl | Cyclopentyl | | 5 | 1 | | |
| Cycloheptyl | Cycloheptyl | | 6 | 2 | | |
| Cyclooctyl | Cyclooctyl | | 5 | 2 | | |
| Methyl | Cyclohexyl | | 10 | 1 | | |
| Isopropyl | Cyclooctyl | | 3 | 0 | | |

EXAMPLE 5

Emulsions are prepared from N,N'-di-(cyclohexyl)-carbodiimide and N,N'-di-(cyclooctyl)-carbodiimide at concentrations of 1 kg. per approximately 700 liters water, and of N-isopropyl-N'-phenyl-carbodiimide at 3 kg. per approximately 700 liters water. The emulsions are sprayed on respective fields of corn and wheat after germination in amounts of 700 liters per hectare. While corn and wheat are unaffected or only slightly affected by the pest control agents, the accompanying weeds are destroyed or severely damaged.

The results of the weed control treatment are tabulated in Table VI.

Table VI

| R₁ | R₂ | Active Agent | Corn | Wheat | Galinsoga parviflora |
|---|---|---|---|---|---|
| Cyclohexyl | Cyclohexyl | 1 | 10 | 10 | 1.7 |
| Cyclooctyl | Cyclooctyl | 1 | 10 | 10 | 3 |
| Isopropyl | Phenyl | 3 | 7 | 6 | 4.5 |

| | | Chenopodium album | Urtica urens | Lamium amplexicaule |
|---|---|---|---|---|
| Cyclohexyl | Cyclohexyl | 0.5 | | |
| Cyclooctyl | Cyclooctyl | 3 | 0 | |
| Isopropyl | Phenyl | 1 | 3 | 5 |

EXAMPLE 6

A composition of 20 pts. or N,N'-di-(cyclohexyl)-carbodiimide, 40 pts. of calcium carbonate and 40 pts. of the calcium salt of lignin sulfonic acid, prepared as mentioned above, is dispersed in water to a concentration of 5 and 7 kg. active compound per 1,000 liters.

The suspensions are sprayed on summer wheat fields in such amounts as to deposit 5 and 7 kg. per ha. of the active compound.

The summer wheat is in the germination to four-leaf stage.

The action upon the growing plants is noted four weeks after treatment.

The summer wheat is not adversely effected but the accompanying weeds are destroyed or severely damaged as seen from Table VII in which the effects of the treatment are evaluated on an arbitrary scale ranging from 10 (no noticeable effect) to 0 (fully destroyed).

Table VII

| | Active Agent, kg./ha. | Summer wheat | Stellaria media | Chenopodium album | Urtica urens | Galinsoga parviflora |
|---|---|---|---|---|---|---|
| Di-cyclohexyl-carbo-diimide | 5 | 9 | 5 | 2 | 3 | 1 |
| Di-cyclohexyl-carbo-diimide | 7 | 8 | 3 | 1 | 3 | 1 |
| Untreated control | | | 10 | 10 | 10 | 10 | 10 |

EXAMPLE 7

The same composition as described in Example 6 is suspended in water to a concentration of 2 kg. active compound per 1,000 liters.

Another composition containing 20 parts of N,N'-di-(cyclohexyl)-carbodiimide dissolved in 60 parts of xylene and 20 parts of tributylphenol-polyglcol-ether is emulsified in water in an analogous manner.

Both preparations are sprayed on carrot fields after germination in such amounts as to deposit 2 kg./ha. of the active agent.

The emulsified preparation in this example shows even better effects on the weeds than the suspension.

Table VIII

| N,N'-Di-cyclohexyl-carbodiimide | Active Agent, kg./ha. | Carrots | Galinsoga parviflora | Thlaspi arvense | Stellaria media | Chenopodium album |
|---|---|---|---|---|---|---|
| Emulsified | 2 | 10 | 0 | 0 | 3 | 2 |
| Suspended | 2 | 10 | 3 | 1 | 6 | 5 |

0=fully destroyed.
10=no noticeable effect.

EXAMPLE 8

A mixture of N,N'-di-cyclohexyl-carbodiimide and isopropyl-N-(3-chlorophenyl)-carbamate is emulsified in water to a concentration of 2 kg. carbodiimide- and 1 kg. carbamate-compound per 1,000 liters. The emulsion is sprayed on a carrot field, after germination, which is infested with broadleaved weeds and Boa annua.

After three weeks the carrots are not adversely affected while the broadleaved weeds and *Boa annua* are nearly fully destroyed.

*Table IX*

| | Active Agent, kg./ha. | Carrots | Broad-leaved weeds | *Boa annua* |
|---|---|---|---|---|
| N,N'-di-(cyclohexyl)-carbodiimide + Isopropyl-N-(3-chlorophenyl)-carbamate | 2+1 | 10 | 0–1 | 0–1 |
| Untreated control | | 10 | 10 | 10 |

0=fully destroyed.
10=no noticeable effect.

EXAMPLE 9

A mixture of N,N'-di-(cyclohexyl)-carbodiimide and isopropyl-N-phenyl-carbamate is emulsified in water to a concentration of 0.84 kg. carbodiimide- and 1.68 kg. carbamate-compound per 1,000 liters. The emulsion is sprayed on a sugar beet field and the action is noted 2 weeks after treatment.

The mixture has no noticeable effect on the sugar beet leaves but the accompanying weeds are severely damaged.

*Table X*

| | Active Agent, kg./ha. | Sugar beets | *Stellaria media* | *Galinsoga parviflora* | *Chenopodium album* |
|---|---|---|---|---|---|
| N,N'-di-(cyclohexyl) carbodiimide + Isopropyl-N-phenyl-carbamate | 0.84 + 1.68 | 8–9 | 0–1 | 0–1 | 0–1 |
| Untreated control | | 10 | 10 | 10 | 10 |

10=no noticeable effect.
0=fully destroyed.

The carbodiimide compounds of the invention also have desirable nematocidal and fungicidal effects as will become apparent from the following examples:

EXAMPLE 10

The fungicidal effects of the carbodiimide compounds are shown in Table XI which lists the effects of three concentrations of active agents on *Plasmopara viticola* (Peronospora).

The tests are performed in the laboratory under closely controlled uniform conditions. Grape leaves are placed in Petri dishes and are sprayed with uniform amounts of aqueous emulsions of the active agents. The sprayed material is permitted to dry, and the leaves are then infected with suspensions of sporangia of the fungus. The fungicidal effects of the pest control agents is determined after 7 to 8 days by measuring the surface area percentage of the leaves showing evidence of Peronospora. The area not affected by the disease is a measure of the protective effect of the pest control agent. Three parallel tests are run for each concentration of each compound. Averages are tabulated in Table XI.

It is apparent from the table that many of the compounds virtually completely suppress growth of the fungus when applied in a concentration of 280 parts per million (p.p.m.), and that the others have a strong effect on the fungus so as to reduce its growth by at least one half. The most active agents reduce fungus growth by 83 percent when employed in amounts of as little as 17.5 p.p.m.

*Table XI*

| $R_1$ | $R_2$ | Percent effect against Peronospora, p.p.m. | | |
|---|---|---|---|---|
| | | 280 | 70 | 17.5 |
| Cyclopentyl | Cyclopentyl | 56 | | |
| Cycloheptyl | Cycloheptyl | 99 | 35 | |
| Cyclooctyl | Cyclooctyl | 100 | | |
| Methyl | ...do... | 100 | 75 | |
| Allyl | ...do... | 100 | 94 | 83 |
| Isopropyl | 4-ethoxyphenyl | 83 | 50 | |
| Do | β-Naphthyl | 100 | 82 | |
| Benzyl | Phenyl | 100 | | |
| Isopropyl | Benzyl | 91 | | |
| tert.-Butyl | 3-lauryloxypropyl | 57 | | |

EXAMPLE 11

The nematodicidal effects of carbodiimides of the invention are tested on larvae of (A) *Aphelenchoides ritzemabosi* (Schwartz)
(D) *Ditylenchus dipsaci* (Kuehn)
(M) *Meloidogyne incognita* (Kofoid & White), chitwood The larvae are freshly collected from plant parts and are added to 2 ml of aqueous suspensions or emulsions of the active agents at several concentrations. The liquid specimens are held at 20° C. for 24 hours. The percentage of larvae still active is determined. Those not showing any movement are considered killed. The percentage of larvae killed is given in Table XII. The test animals are identified by the initials as indicated above.

*Table XII*

| $R_1$ | $R_2$ | Test Animal | Nematode larvae killed, percent at concentration of active agent | | | |
|---|---|---|---|---|---|---|
| | | | 0.1 | 0.05 | 0.01 | 0.005 |
| Cyclopentyl | Cyclopentyl | (A) | 100 | 100 | 100 | 100 |
| | | (D) | 100 | 100 | 98 | 80 |
| | | (M) | 100 | 100 | 100 | 100 |
| Cyclohexyl | Cyclohexyl | (A) | 100 | 100 | 100 | 100 |
| | | (D) | 100 | 100 | 98 | 98 |
| | | (M) | 100 | 100 | 100 | 100 |
| Cycloheptyl | Cycloheptyl | (A) | 100 | 98 | 98 | 95 |
| | | (D) | 100 | 100 | 98 | 95 |
| | | (M) | 100 | 100 | 100 | 100 |
| Isopropyl | Cyclooctyl | (A) | 100 | 100 | 100 | 95 |
| | | (D) | 98 | 95 | 90 | 50 |
| | | (M) | 100 | 100 | 100 | 100 |
| Allyl | Cyclooctyl | (A) | 100 | 100 | 100 | 95 |
| | | (D) | 100 | 100 | 100 | 100 |
| | | (M) | 100 | 100 | 100 | 100 |

Table XII—Continued

| $R_1$ | $R_2$ | Test Animal | Nematode larvae killed, percent at concentration of active agent | | | |
|---|---|---|---|---|---|---|
| | | | 0.1 | 0.05 | 0.01 | 0.005 |
| Isopropyl | Phenyl | (A) | 100 | 100 | 100 | 95 |
| | | (D) | 100 | 98 | 30 | 0 |
| | | (M) | 100 | 100 | 100 | 100 |
| tert.-Butyl | do | (A) | 100 | 100 | 100 | 98 |
| | | (D) | 100 | 100 | 80 | 70 |
| | | (M) | 100 | 100 | 100 | 100 |
| Hexyl | do | (A) | 100 | 100 | 100 | 100 |
| | | (D) | 100 | 100 | 98 | 80 |
| | | (M) | 100 | 100 | 100 | 100 |
| Isopropyl | 4-Ethoxyphenyl | (A) | 100 | 100 | 100 | 100 |
| | | (D) | 100 | 80 | 80 | 80 |
| | | (M) | 100 | 100 | 100 | 100 |
| Do | 4-Bromo-phenyl | (A) | 100 | 100 | 100 | 100 |
| | | (D) | 100 | 100 | 100 | 98 |
| | | (M) | 100 | 100 | 100 | 100 |
| Benzyl | Phenyl | (A) | 100 | 100 | 100 | 100 |
| | | (D) | 98 | 80 | 50 | 50 |
| | | (M) | 100 | 100 | 100 | 100 |
| Phenyl | 4-Chloro-2-methyl-phenyl | (A) | 100 | 100 | 70 | 50 |
| | | (D) | 30 | 0 | 0 | 0 |
| | | (M) | 100 | 100 | 80 | 50 |
| Isopropyl | Benzyl | (A) | 100 | 100 | 100 | 100 |
| | | (D) | 100 | 100 | 100 | 95 |
| | | (M) | 100 | 100 | 100 | 100 |
| Hexyl | Isopropyl | (A) | 100 | 100 | 100 | 95 |
| | | (D) | 100 | 100 | 50 | 30 |
| | | (M) | 100 | 100 | 100 | 100 |
| tert.-Butyl | Furfuryl | (A) | 100 | 100 | 90 | 80 |
| | | (D) | 100 | 100 | 70 | 50 |
| | | (M) | 100 | 100 | 100 | 100 |

It should be understood, of course, that the foregoing disclosure relates to only preferred embodiments of the plant protection method of the invention, and that numerous modifications and alterations may be made therein without departing from the spirit and scope of the invention as set forth in the appended claims.

We claim:

1. A method of combatting weeds which comprises applying to said weeds a herbicidal amount of a compound having the formula $$R_1-N=C=N-R_2$$

wherein $R_1$ and $R_2$ are each selected from the group consisting of
   (a) lower alkyl;
   (b) cycloalkyl having a saturated carbon ring of five to eight members, one of said members being directly connected to one of the nitrogen atoms of said formula;
   (c) lower alkenyl;
   (d) radicals of the formula —Alk—X, wherein Alk is lower alkylene and X is a member of the group consisting of lower alkoxy, phenyl, lauroxy, and morpholyl;
   (e) radicals of the formula

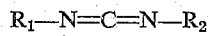

wherein Y and Z are members of the group consisting of hydrogen, lower alkyl, halogen, $NO_2$, lower alkoxy, and a $-(CH)_4=$ chain jointly constituted by said Y and Z and attached to adjacent carbon atoms of the benzene ring of the last mentioned formula;
   (f) alkenoyl having substantially eighteen carbon atoms; and
   (g) furfuryl.

2. A method as set forth in claim 1, wherein at least one of said $R_1$ and $R_2$ is cycloalkyl of the formula

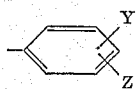

wherein $n$ is an integer between four and seven.

3. A method as set forth in claim 1, wherein said compound is N,N'-dicyclohexyl-carbodiimide.

4. A method of combatting fungi which comprises applying to said fungi a fungicidal amount of a compound having the formula $$R_1-N=C=N-R_2$$

wherein $R_1$ and $R_2$ are each selected from the group consisting of
   (a) lower alkyl;
   (b) cycloalkyl having a saturated carbon ring of five to eight members, one of said members being directly connected to one of the nitrogen atoms of said formula;
   (c) lower alkenyl;
   (d) radicals of the formula —Alk—X, wherein Alk is lower alkylene and X is a member of the group consisting of lower alkoxy, phenyl, lauroxy, and morpholyl;
   (e) radicals of the formula

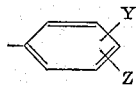

wherein Y and Z are members of the group consisting of hydrogen, lower alkyl, halogen, $NO_2$, lower alkoxy, and a $-(CH)_4=$ chain jointly constituted by said Y and Z and attached to adjacent carbon atoms of the benzene ring of the last mentioned formula;
   (f) alkenoyl having substantially eighteen carbon atoms; and
   (g) furfuryl.

5. A method as set forth in claim 4, wherein at least one of said $R_1$ and $R_2$ radicals is cycloalkyl.

6. A method as set forth in claim 4, wherein said compound is N,N'-dicyclohexyl-carbodiimide.

7. A method of combatting nematodes which comprises applying to said nematodes a nematocidal amount of a compound of the formula $$R_1-N=C=N-R_2$$

wherein $R_1$ and $R_2$ are each selected from the group consisting of
   (a) lower alkyl;
   (b) cycloalkyl having a saturated carbon ring of five to eight members one of said members being directly connected to one of the nitrogen atoms in said formula;

(c) lower alkenyl;
(d) radicals of the formula —Alk—X, wherein Alk is lower alkylene and X is a member of the group consisting of lower alkoxy, phenyl, lauroxy and morpholyl;
(e) radicals of the formula

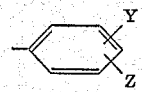

wherein Y and Z are members of the group consisting of hydrogen, lower alkyl, halogen, $NO_2$—, lower alkoxy, and a —$(CH)_4$= chain jointly constituted by said Y and Z and attached to adjacent carbon atoms of the benzene ring of the last mentioned formula;

(f) alkanoyl having substantially eighteen carbon atoms; and
(g) furfuryl.

References Cited by the Examiner
UNITED STATES PATENTS
2,942,025   6/60   Coles _____ 260—551

OTHER REFERENCES
King: "Insecticides and Repellants," U.S. Dept. Agri., Agricultural Handbook No. 69, issued May 1954, p. 109.

JULIAN S. LEVITT, *Primary Examiner.*
M. A. BRINIDISI, LEWIS GOTTS, *Examiners.*